(12) United States Patent
Bates et al.

(10) Patent No.: US 12,436,071 B2
(45) Date of Patent: Oct. 7, 2025

(54) METHOD

(71) Applicant: Conopco, Inc., Englewood Cliffs, NJ (US)

(72) Inventors: Susan Bates, Heswall (GB); Stephanie Maria Blissett, Todmorden (GB); Zane Ashley James Brough, Middlesbrough (GB); Steven Michael Cenci, Sittingbourne (GB); Gerald Clarkson, Wirral (GB); Raymond John Marriott, Kettering (GB)

(73) Assignee: Conopco, Inc., Hoboken, NJ (US)

( * ) Notice: Subject to any disclaimer, the term of this patent is extended or adjusted under 35 U.S.C. 154(b) by 296 days.

(21) Appl. No.: 18/258,059

(22) PCT Filed: Dec. 16, 2021

(86) PCT No.: PCT/EP2021/086107
§ 371 (c)(1),
(2) Date: Jun. 16, 2023

(87) PCT Pub. No.: WO2022/129287
PCT Pub. Date: Jun. 23, 2022

(65) Prior Publication Data
US 2024/0003790 A1    Jan. 4, 2024

(30) Foreign Application Priority Data
Dec. 18, 2020   (EP) .................................. 20215466

(51) Int. Cl.
*G01N 1/40*    (2006.01)
*B01D 11/02*   (2006.01)
*B01D 11/04*   (2006.01)

(52) U.S. Cl.
CPC ....... *G01N 1/4055* (2013.01); *B01D 11/0203* (2013.01); *B01D 11/0403* (2013.01);
(Continued)

(58) Field of Classification Search
CPC ............... G01N 1/4055; G01N 1/4022; G01N 2001/4061; B01D 11/0203; B01D 11/0403; B01D 11/0407
See application file for complete search history.

(56) References Cited

U.S. PATENT DOCUMENTS

| | | | |
|---|---|---|---|
| 5,132,014 A | 7/1992 | Allington et al. | |
| 5,601,707 A * | 2/1997 | Clay | F16K 15/1823 210/511 |

(Continued)

FOREIGN PATENT DOCUMENTS

| | | |
|---|---|---|
| AU | 2017353143 | 5/2019 |
| WO | WO2018082882 | 5/2018 |

OTHER PUBLICATIONS

Search Report and Written Opinion in EP20215466; Jun. 14, 2021; European Patent Office (EPO).

(Continued)

*Primary Examiner* — Paul M. West
(74) *Attorney, Agent, or Firm* — Stephanie Huang

(57) ABSTRACT

A method of extracting a substance comprising the steps of: placing a substrate on which a substance has been adsorbed into a container; feeding a solvent into the container whilst restricting its exit to achieve a predetermined pressure of the solvent in the container, wherein the solvent has a critical point and the predetermined pressure is above the critical point of the solvent; releasing the solvent and an extract comprising extracted substances into a separator; reducing the temperature and pressure in the separator to remove a gaseous portion of the solvent from the extract; collecting the extract remaining from the separator.

13 Claims, 9 Drawing Sheets

(52) U.S. Cl.
CPC ....... *B01D 11/0407* (2013.01); *G01N 1/4022* (2013.01); *G01N 2001/4061* (2013.01)

(56) References Cited

U.S. PATENT DOCUMENTS 5,660,727 A * 8/1997 Gleave ............... B01D 11/0273
                                                                             210/511
10,695,691 B2     6/2020 Crandall et al.

OTHER PUBLICATIONS

Paula B. Gomes et al.; Production of rose geranium oil using supercritical fluid extraction; The Journal of Supercritical Fluids; 2007; pp. 50-60.; vol. 41, Issue 1; Elsevier BV.

C. Da Porto and D. Decorti; Supercritical CO2 extraction of grappa volatile compounds.; International Journal of Food Science & Technology; 2009; pp. 1927-1932; 44.

E. Reverchon and G. Della Porta; Supercritical CO2 Extraction and Fractionation of Lavender Essential Oil and Waxes; Journal of Agricultural and Food Chemistry; 1995; pp. 1654-1658; 43 (6); American Chemical Society.

Ernesto Reverchon et al.; Modeling of Supercritical Fluid Extraction from Herbaceous Matrices; Industrial & Engineering Chemistry Research; 1993; pp. 2721-2726; 32 (11); American Chemical Society.

Miguel Herrero et al.; Sub- and supercritical fluid extraction of functional ingredients from different natural sources: Plants, food-by-products, algae and microalgae: A review; Food Chemistry; 2006; pp. 136-148.; vol. 98, Issue 1; Elsevier Ltd.

Ernesto Reverchon; Supercritical fluid extraction and fractionation of essential oils and related products; Journal of Supercritical Fluids; 1997; pp. 1-37; vol. 10, Issue 1; Elsevier Science BV.

IPRP2 in PCTEP2021086107; Feb. 8, 2023; World Intellectual Property Org. (WIPO).

Written Opinion of the IPEA in PCTEP2021086107; Nov. 23, 2022; World Intellectual Property Org. (WIPO).

Search Report and Written Opinion in PCTEP2021086107; Feb. 2, 2022; World Intellectual Property Org. (WIPO).

* cited by examiner

Figure 5a
Figure 5b
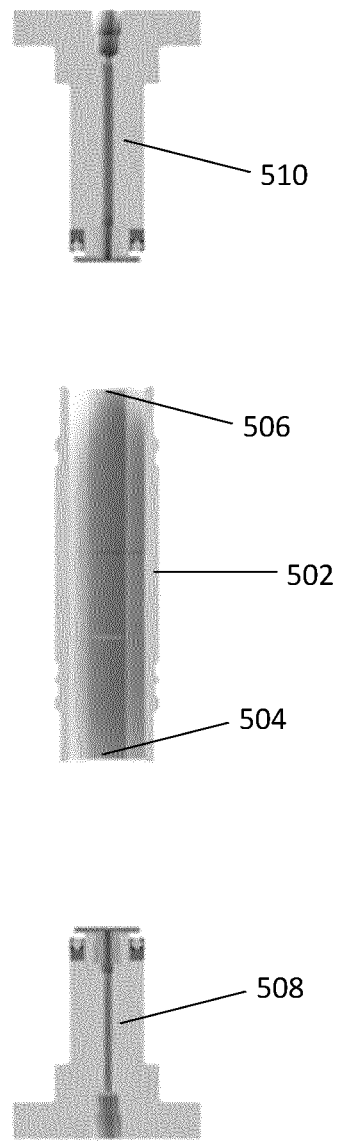
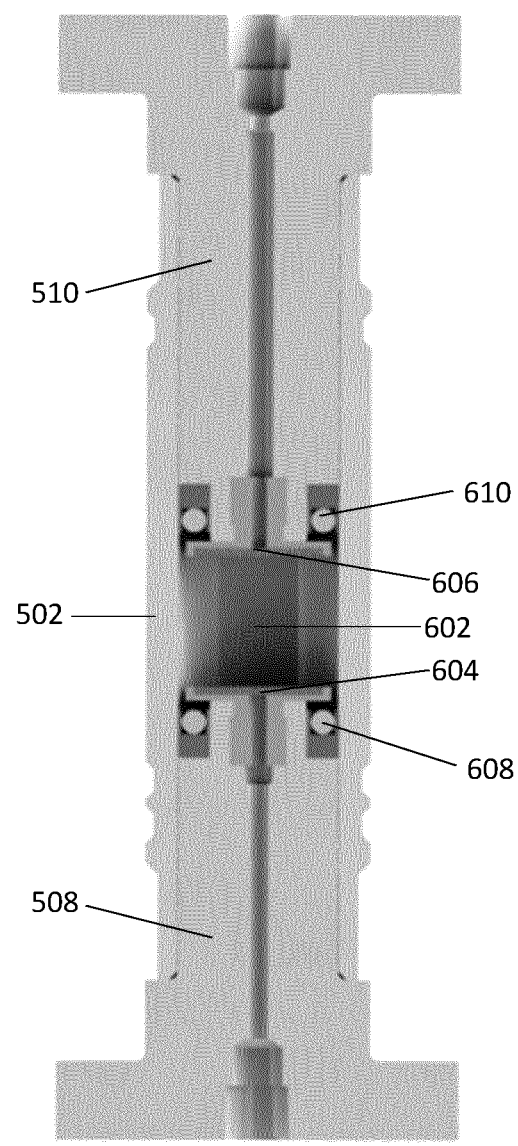

METHOD

RELATED APPLICATIONS

The present application is a national phase filing under 35 USC 371 of International Application No. PCT/EP2021/086107, filed on Dec. 16, 2021, which claims priority from European Patent Application No. 20215466.2, filed on Dec. 18, 2020, the contents of which are incorporated herein in their entirety for all purposes.

This invention relates to a method for extracting a substance, and particularly, but not exclusively, to a method for extracting and analysing a substance.

The invention relates particularly to a method for extracting and analysing malodourous substances and particularly to the extraction and analysis of malodourous molecules of the type responsible for driving under arm malodour perception.

The invention also relates to an apparatus for extracting a substance and particularly to an apparatus for extracting and analysing malodourous substances of the type responsible for driving underarm malodour perception.

The invention further relates to a container for containing a substance whilst the substance is extracted and analysed according to the method and apparatus of the invention.

The molecules responsible for driving under arm malodour perception are well reported in the literature and consist of short to medium chain volatile fatty acids and thiols. Stable sampling and extraction of these molecules for subsequent quantitative analysis of volatile components is a challenge. Samples are biogenically unstable due to the bacterial components present. Additionally, and most importantly, the molecules are present at extremely low levels (PPT/PPB) and accurate quantification at these trace levels is required to accurately discriminate between samples.

In the field of personal care, and particularly in the field of deodorants, there is a need to rapidly screen the efficacy of odour control technologies in order to improve the efficacy of deodorants.

A known method of analysing molecules responsible for driving under arm malodour involves a fabric swatch or substrate being worn under an arm of a volunteer. The swatch is worn for a predetermined length of time before a human assessment panel effectively sniff and score levels of odour intensity directly from the underarm of a volunteer. Alternatively the swatch comprising a sample of the malodourous molecules is removed by hand and placed in a sample container. The swatch may be sniffed by a human assessment panel at a later time, and similarly allocated a score representative of the perceived level of odour intensity.

Using such a method to analyse malodourous molecules introduces a high level of subjectivity, and assessment of odour character is challenging. On the other hand, known analytical methods of measuring and analysing odorous molecules, such as gas chromatography and solid phase microextraction (SPME) are complex and time consuming leading to a low throughput. A low throughput hampers analysis of large studies. The sensitivity and limit of detection of the analytical instrumentation must also be highly sensitive as the molecules responsible for odour may be present at extremely low level (PPT/PPB).

Further, techniques such as SPME are selective and do not provide the true quantification required of a sample's composition.

Liquid extraction techniques require large volumes of solvents and, for analysis of compounds present at low levels, this compromises the detection.

Use of supercritical extraction is well known as a clean and highly efficient technique but it is not yet common place for extraction of volatile components for analytical measurement.

A supercritical fluid (SCF) is a fluid that shares properties of both a gas and a liquid where distinct gas and liquid phases don't exist. Supercritical fluids occur when a substance is at a temperature and pressure above its critical point. For example, carbon dioxide reaches its critical point at about 31° C. and 74 bar.

According to a first aspect of the invention there is provided a method of extracting a substance comprising the steps of:

placing a substrate on which a substance has been adsorbed into a container;

feeding a solvent into the container whilst restricting its exit to achieve a predetermined pressure of the solvent in the container, wherein the solvent has a critical point and the predetermined pressure is above the critical point;

releasing the solvent and an extract comprising extracted substances into a separator;

reducing the temperature and pressure in the separator to remove a gaseous portion of the solvent from the extract;

collecting the extract remaining from the separator.

By means of the present invention it is possible to maintain the integrity of a sample of a substance that has been adsorbed onto a substrate prior to, and during, the extraction and analysis of that substance. This is because once the substrate on which the substance has been adsorbed is placed in the container it remains in the container throughout storage and throughout the extraction process.

The container containing the substrate may be shipped and stored at reduced temperatures (typically −20 to −80 C) prior to extraction, due to the fact that such samples are biogenically unstable.

By means of the present invention therefore, it is possible to robustly and reproducibly extract a substance for subsequent analysis and quantification of the components of that substance.

In embodiments of the invention, the solvent may transition into a supercritical fluid within the container as it may be heated to a temperature above its critical point as well as being pressurised to a pressure above its critical point.

The invention has particular application in, although is not limited to, the fields of personal care, fast-moving consumer goods (FMCG), home care, environmental health and health care. For demonstrative purposes the invention may be described, from here in, based on the invention's application in the particular field of deodorants. However, the invention is not limited to this exemplar application and is rather a method applicable to extracting any suitable substance from a suitable substrate.

In embodiments of the invention, the method comprises the further initial step of adsorbing the substance onto a substrate.

In embodiments of the invention, the substance comprises a sample of sweat taken directly from the human axilla (armpit). In such embodiments of the invention, the step of adsorbing a sample of sweat onto a substrate comprises the step of placing the substrate onto the human axilla such that sweat and vapour produced by the human is adsorbed by the substrate.

In embodiments of the invention, the substrate is wearable in close contact with the skin of a person who's sweat and odour is to be analysed.

Once the sample of sweat has been adsorbed onto a substrate it may be stored in the container prior to being extracted from the substrate and subsequently analysed.

In embodiments of the invention, once the substrate has been removed from the skin it will immediately be packed into the container.

In embodiments of the invention, the method comprises a further step after the step of placing the substrate in the container, of sealing the substrate in the container.

In such embodiments, the step of placing the substrate in the container, and then of sealing the substrate in the container may be carried out using a bespoke packing rig which allows for rapid packing of samples of sweat. Such an approach is simple and low cost.

Once the container has been sealed it may be shipped anywhere around the world. It may be shipped at low temperatures such as −78° C. (the temperature of dry ice) or −196° C. (the temperature of liquid nitrogen), for example.

In embodiments of the invention, the container is sealed by using crimped caps to close the container once a sample has been placed in the container. The crimpled caps form first and second closures positioned at first and second ends respectively of the container.

In embodiments of the invention, the method comprises the further step, prior to the step of feeding the solvent into the container, of maintaining the temperature of the container at a predetermined temperature. In such embodiments, the predetermined temperature is generally less than room temperature. If the container is to be stored for up to a month, for example if long-distance shipping is required, then the predetermined temperature may be −78° C. or −196° C. as mentioned above. However, if the container is to be stored for smaller periods of time then the predetermined temperature may be −20° C. Also, the predetermined temperature may depend on the substance adsorbed on the substrate. A volatile or biogenically unstable substance may require a lower predetermined temperature than a stable substance.

In embodiments of the invention, where the container is sealed once the substrate has been placed in the container, the step of maintaining the container at a predetermined temperature may take place after the step of sealing the substrate in the container.

By storing the substrate on which the substance has been adsorbed in a sealed container at a reduced temperature, of about −80° C. for example, the maintenance of the sample's integrity during storage is improved. This means that once the sample is extracted from the substrate for analysis, the integrity of the sample will have been maintained at or very close to its original level.

By maintaining the container and the sample at a temperature of −80° C., the sample may remain stable for up to one month. This can be useful if it is not possible to analyse the sample immediately after it has been removed from the skin and the person.

In other embodiments of the invention, the substance may be extracted from the substrate immediately after the substrate is harvested from the person who's sweat and odour is to be analysed. Thereby the requirement for a storage step, during which the temperature of the substance is maintained at a predetermined level, is removed.

The container may be any suitable container. The container must be able to withstand pressure of up to 500 bar. In embodiments of the invention, the container comprises a first openable end and a second openable opposite end.

The container may be made from any suitable material, and in embodiments of the invention, the container is formed from a metal or metallic substance. In such embodiments the container may be formed of stainless steel.

In embodiments of the invention the container is re-useable and may be cleaned by hand, or in a dishwasher, for example.

The container may be made from a low-cost material in order that the overall cost of the container is kept low and large number of containers may therefore be produced cost efficiently.

The container may have any suitable shape, and in some embodiments of the invention the container is in the form of an extraction tube or extraction basket.

The extraction basket may have a highly polished internal finish (0.2-0.8 Ra), preferably 0.3 Ra.

The substrate may be any suitable substrate and in embodiments of the invention the substrate comprises a solid or semi-solid substrate.

In embodiments of the invention, the substrate is formed of a textile (such as cotton, polycotton or polyester) although other materials may also be suitable including, but not limited to, hydrogels and other adsorbent, skin-safe polymeric materials. The substrate may also be the sample itself, for example in biological samples such as a leaf.

In embodiments of the invention, the method comprises an additional step, prior to the step of feeding supercritical fluid into the container, of removing the first and second closures of the container and replacing the first and second closures with first and second plungers respectively, which first and second plungers are releasably and sealably engageable with the first and second ends respectively of the container.

In embodiments of the invention the first and second plungers are shaped to be removably insertable into the container. In such embodiments of the invention, the first and second plungers are engaged into the openings of the container.

The plungers are surrounded by a seal whereby the design and material must completely seal the container and comply with the surface of the extraction basket under pressure.

In embodiments of the invention, the method comprises the further step of applying compression to the substrate after it has been placed in the container.

In such embodiments of the invention, compression may be applied to the sample after the step of replacing the first and second closures with the first and second plungers. In embodiments of the invention the compression applied is axial compression. Such compression may increase the volatile recovery of the substance and reduce the total volume of required extraction solvent. The plunger and seal combination form a pressure-tight environment in the container.

In embodiments of the invention, the method comprises a further step carried out prior to and during the feeding of a solvent into the container, of maintaining the container and the substrate at a predetermined temperature.

In such embodiments, the predetermined temperature may be between 31 and 80° C. and typically 50° C.

In embodiments of the invention, the step of maintaining the container and the substrate at the predetermined temperature comprises the step of encasing the container in a shroud prior to feeding the solvent into the container.

By encasing the container in a shroud it is possible to ensure that the container is rapidly heated to the predetermined temperature and then maintained at that temperature.

In embodiments of the invention, the step of feeding a solvent into the container comprises pumping the solvent into the container through the first plunger.

A predetermined pressure is achieved in the container with the use of a back-pressure regulator located downstream of the second plunger. The back-pressure regulator operates by preventing the exit of solvent from the container through the second plunger when the pressure in the container is lower than the predetermined pressure. When the predetermined pressure has been exceeded, the back-pressure regulator opens so that solvent can flow and exit through the second plunger, thereby maintaining the pressure at the predetermined level.

The above method step may be achieved in any convenient manner. For example, in embodiments of the invention, the first plunger may comprise a conduit extending through the first end of the container, which conduit allows solvent to pass into the container. Whilst the solvent is being fed into the container, it will not be able to exit the container via the first end due to the flow of solvent entering the container. The flowrate of solvent into the container is controlled by a pump.

In embodiments of the invention, the back-pressure regulator may be an electrically controlled valve connected to a pressure sensor wherein the valve is automated to open when pressures are measured above the predetermined pressure. In other embodiments, the back-pressure regulator may be a mechanical spring-loaded valve wherein the spring is adapted such that it compresses when the pressure it experiences is above the predetermined pressure, thereby opening the valve.

Exit of the SCF via the second end of the container is therefore restricted by the back-pressure regulator.

In embodiments of the invention, solvent is fed into the container via the first end of the container and its exit is restricted from the second end of the container by means of the back-pressure regulator. The plunger seal will maintain the pressure within the extraction basket.

The combination of pressure and temperature in the extraction basket achieves the SCF state of the solvent within the container.

The seals surrounding the first and second plungers may be lip seals adapted to create a pressure-tight seal between the first plunger and the first end of the container.

In embodiments of the invention, the method comprises the further step prior to the step of feeding the solvent into the container, of generating the solvent by mixing components comprising an extraction solvent and a co-solvent together, wherein the extraction solvent is sub-critical or supercritical $CO_2$ or a different solvent capable of reaching sub-critical or supercritical parameters.

In such embodiments of the invention, the extraction solvent may be any solvent capable of reaching sub-critical or supercritical parameters such as $CO_2$ or 1,1,1,2-tetrafluoroethane (R-134a), for example.

In some embodiments of the invention, the co-solvent may be a mixture of up to six co-solvent components. In other embodiments there may be more co-solvent components. The co-solvent components may be used as modifiers or as make-up solvents through the use of a parallel line which bypasses the extraction process.

In embodiments of the invention the step of feeding the solvent into the container comprises the step of creating a supercritical fluid environment within the container by generating a predetermined pressure between 74 and 450 bar. The pressure is maintained substantially constant within the container at the predetermined level.

Once the extraction basket has been pressurised to the desired pressure, the back-pressure regulator opens, releasing solvent and extract at constant pressure into the separator. In such embodiments, the solvent and extract will be released via the second end of the container into the separator.

The temperature in the separator is constant but lower than in the extraction basket. The separator facilitates the separation of gas from liquid components.

In embodiments of the invention, the method comprises the additional step of adjusting the pressure of the solvent and extract mixture as it is released into the separator. In embodiments of the invention the solvent and extract mixture is depressurized from what it was as a supercritical fluid to 25 bar. This depressurisation causes the extraction solvent (typically $CO_2$) to be vented from the separator.

Because the temperature and pressure are controlled as described hereinabove, the extraction solvent ($CO_2$) is removed without fractionation or loss of the extracted components.

In embodiments of the invention the separator comprises a baffle assembly and the step of reducing the temperature and pressure in the separator comprises causing the gaseous portion of the solvent to flow through the baffle assembly to separate substances entrained in the gaseous portion of the solvent as an aerosol from the gaseous portion of the solvent.

In such embodiments of the invention the baffle assembly may comprise one or more baffles configured to allow any heavy material that deposits on internal walls of the separator due to the cyclonic effect to remain in a discrete space which can be more easily cleaned. Also, each baffle may comprise a fine mesh suitable for separating aerosol substances from gaseous substances.

In embodiments of the invention the method may comprise the further step of causing substances separated from the gaseous portion of the solvent in the baffle assembly to flow from the baffle assembly to be collected with the extract.

In such embodiments of the invention, the baffles may be shaped suitably to cause the flow of substances separated from the gaseous portion of the solvent to a bottom portion of the separator from which liquid including the extract may be collected. The baffles may be downward cone shaped for example.

Finally, the extract that remains in the container is collected.

The step of collecting the extract remaining in the separator may comprise the step of syphoning the extract into a collection container prior to dispensing. Alternatively the extract may be dispensed directly into a sample vial.

The method may comprise a further step of analysing the extract that has been collected from the container.

The step of analysing the extract may comprise the step of mixing the extract from the separator and dispensing it into vials for external analysis.

In embodiments of the invention the method may comprise the further step, following the collection of the extract, of flooding the separator with cleaning solvent to remove solids from the separator. Additionally, the method may comprise the step of controlling the flow rate of the cleaning solvent such that self-cleaning occurs.

In such embodiments of the invention solid substances deposited on the walls of the separator, such as heavy metals, may be removed so that the separator is clean for its next use. Further, self-cleaning may be automated to reduce the burden on a person carrying out the method.

In embodiments of the invention any one or more of the steps described above are performed by an automated, robotic system.

In such embodiments of the invention the method of extracting a substance may be partially or fully automated.

The invention will now be further described by way of example only with reference to the accompanying drawings in which:

FIGS. 5a and 5b are more detailed schematic representations of a container shown in FIG. 3.

Figure 1:
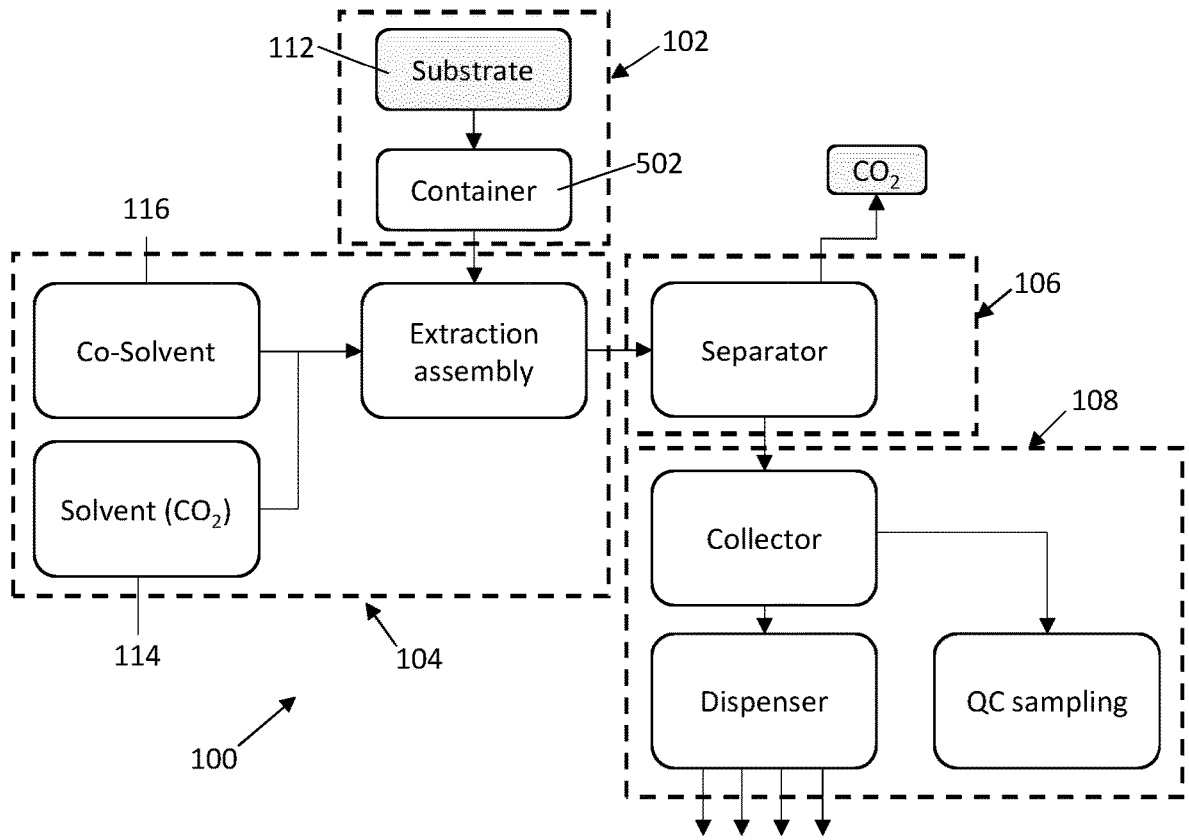
FIG. 1 is a schematic representation of a method of collecting and analysing a substance according to an embodiment of the invention which may be carried out using the system and rig of FIGS. 2 and 3.

Referring initially to FIG. 1, an embodiment of a method according to the invention is schematically represented. The method is designated generally by the reference numeral 100 and has four main stages as described below.

The first stage is the sample collection stage 102. This comprises the step of adsorbing a substance onto a substrate 112.

In the illustrated embodiment, the substance is a sample of sweat that is to be analysed. However, in other embodiments of the invention, the substance may be any suitable substance to be extracted from the substrate. The substrate 112 may therefore be worn by the person whose sweat is to be sampled. Such a substrate may be wearable in close contact with the skin.

Figure 3:
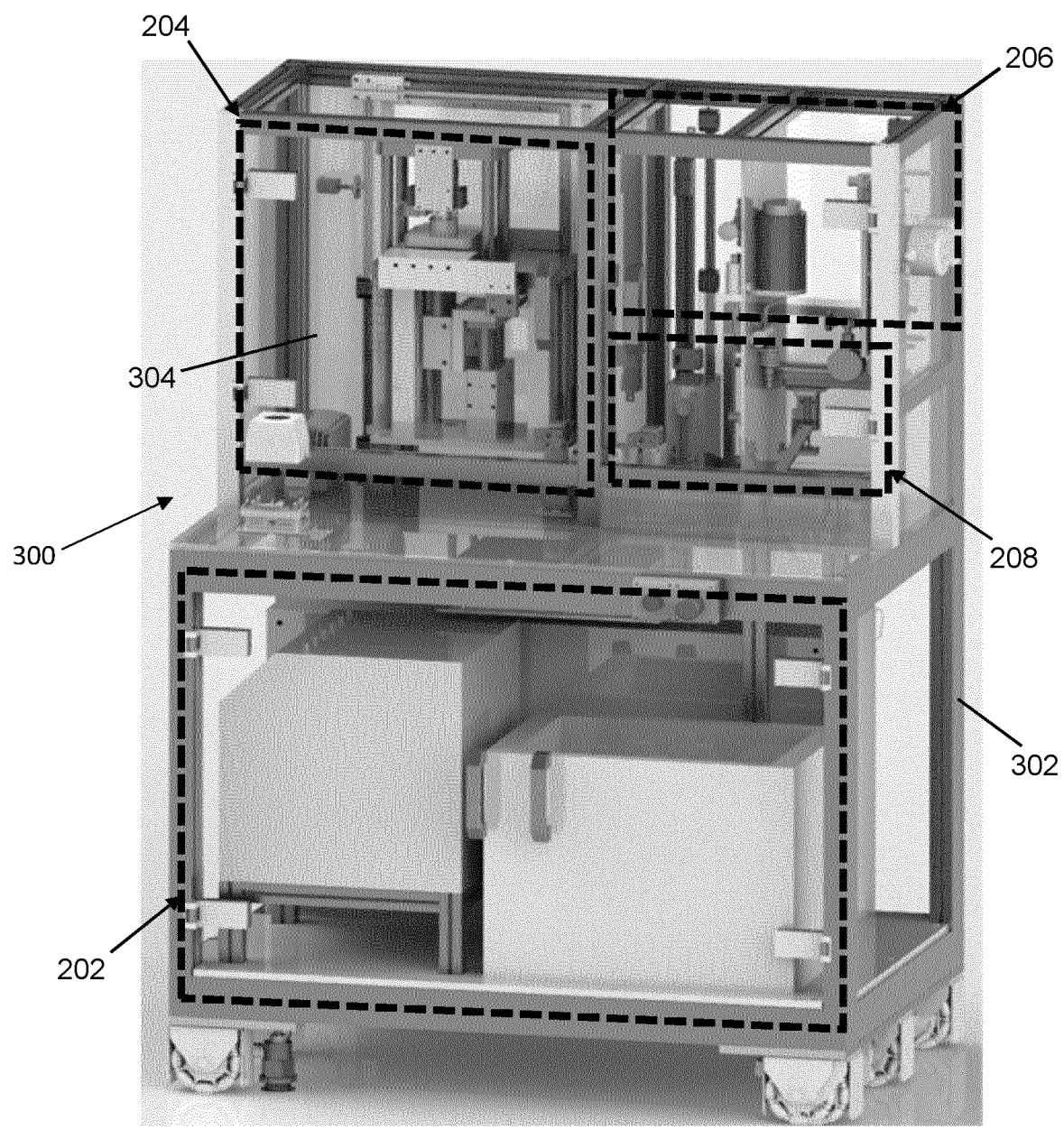
FIG. 3 is a schematic representation of a rig incorporating the system of FIG. 2.
Figure 4:
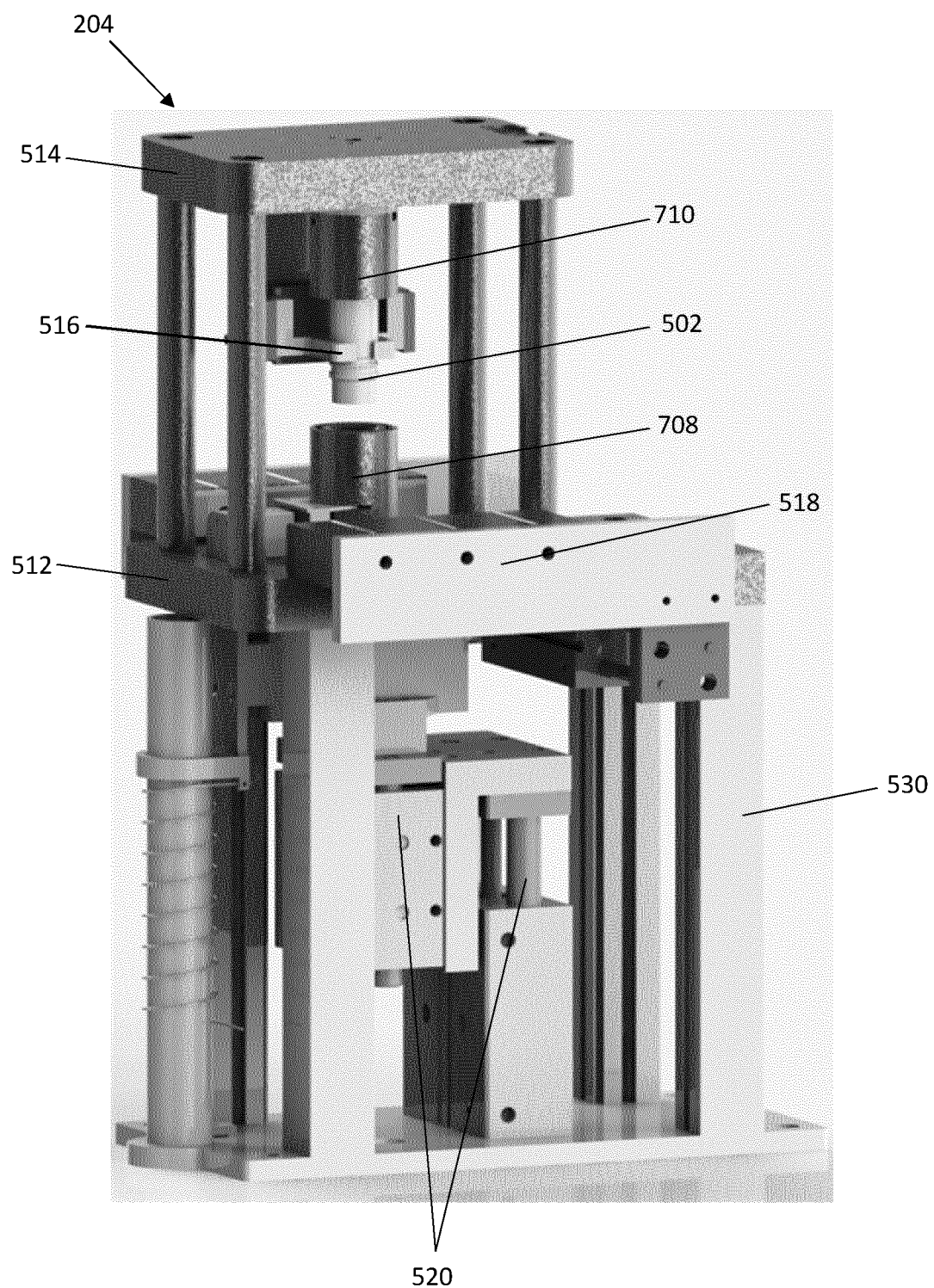
FIG. 4 is a schematic representation of an extraction assembly forming part of the rig shown in FIG. 3.

Once sweat has been adsorbed by the substrate 112, the substrate may be removed from the skin and immediately packed in a container 502 according to embodiments of the invention, and as illustrated in FIG. 4. In embodiments of the invention, the step of placing, or packing the substrate in the extraction basket may be facilitated through the use of a packing rig. This unit is remote from the rig 300 (shown in FIG. 3) and enables packing of the samples at the destination of initial collection.

Once the substrate 112 on which the sweat has been adsorbed has been packed into a container 502, closures (not shown) are sealingly attached to the container 502 in order to seal the substrate 112 with sample substance within the container 502.

At this stage, the container 502 may be placed in cold storage where the temperature of the container may be reduced to −80° C., for example. This is in order to maintain the integrity of the sample within the container and any volatile substances collected on the sample may be preserved prior to being analysed. The temperature required for storage will depend on the storage duration and the components extracted and may be between 3° C. and −196° C., though it is typically between −20° C. and −80° C.

The second stage of the method represented in FIG. 1 is the extraction stage 104.

Figure 2:
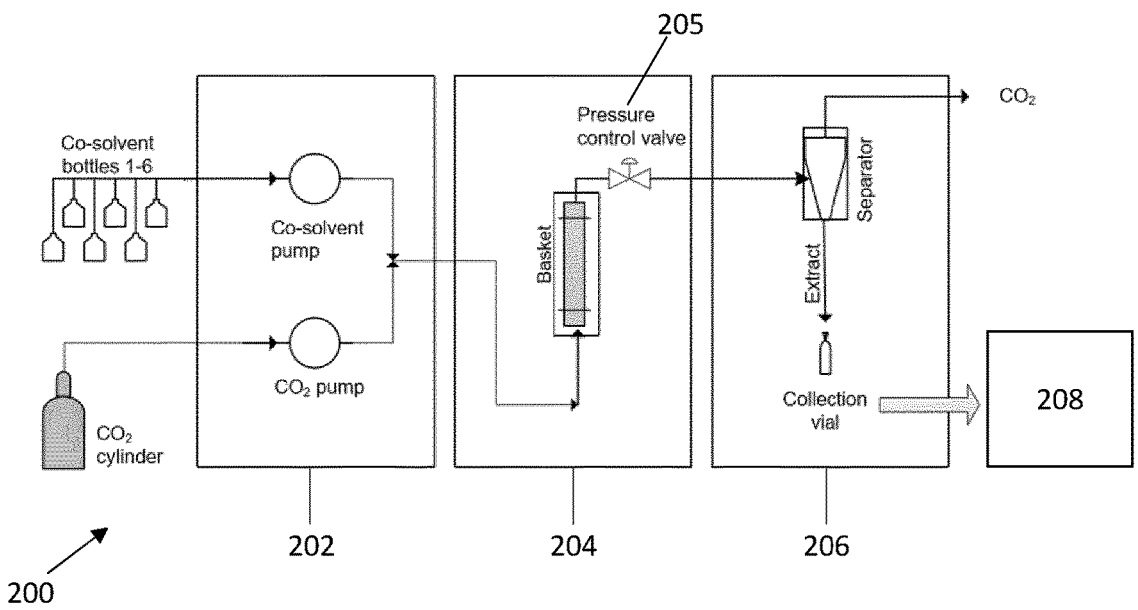
FIG. 2 is a schematic representation of a system according to an embodiment of the invention for collecting and analysing a volatile substance.

In order to extract the substance from the substrate 112, the container 502 is removed from the cold storage, the closures removed from the container 502 and the container 502 is loaded into an apparatus for collecting and extracting a substance according to an embodiment of the invention which is illustrated in FIGS. 2 and 4. The apparatus is designated generally by the reference numeral 200.

As shown in FIG. 2, the apparatus comprises four subsystems or modules. The first module is a fluid delivery assembly 202. Operatively connected to the fluid delivery assembly 202 is an extraction assembly 204 which in turn is operatively connected to a separation assembly 206 which is in turn operatively connected to a dispenser assembly 208.

The system may be in the form of a rig 300 as shown in FIG. 3. The rig 300 comprises the fluid delivery assembly 202, the extractor assembly 204, the separation assembly 206 and the dispenser assembly 208. In this embodiment of the invention, the rig 300 is fully automated such that it is capable of performing method steps 104, 106 and 108 without requiring the manual intervention of an operator.

The modules forming the system 200 are contained within a frame 302. Further, the extraction assembly 204 is contained within a heated enclosure 304 which enables the environment surrounding the extractor assembly 204 to be controlled.

The operation and purpose of each of these assemblies will be explained in more detail below.

Referring now to FIG. 4, the extraction assembly 204 comprises the container 502. The container 502 is shown in greater detail in FIG. 5a having a first open end 504 and a second, opposite open end 506.

The extraction assembly 204 further comprises a first plunger 508 adapted to close end 504, and a second plunger 510 adapted to close end 506.

Referring now to FIG. 5b, each of the plungers 508, 510 is insertable within the container 502, such that when each of the plungers 508, 510 is fully engaged, a chamber 602 is defined. In this embodiment of the invention the volume of the chamber 602 is approximately 5 ml, but in other embodiments of the invention components of the extraction assembly 204 could be of different sizes and the chamber 602 may be between 1 ml and 100 ml.

Each of the plungers 508, 510 comprises lip seals 608, 610 respectively. The seals 608, 610 provide controllable seals between respective closures 508, 510 and respective ends 504, 506 of the container 502.

Each of the plungers 508, 510 further comprise frits 604, 606 which are each attached at an end of the respective plungers 508, 510. The frits are adapted to disperse fluid evenly through the full volume of the chamber 602 so that as much of the extractable substance within the substrate can be captured as possible during the extraction process.

Figure 6A:
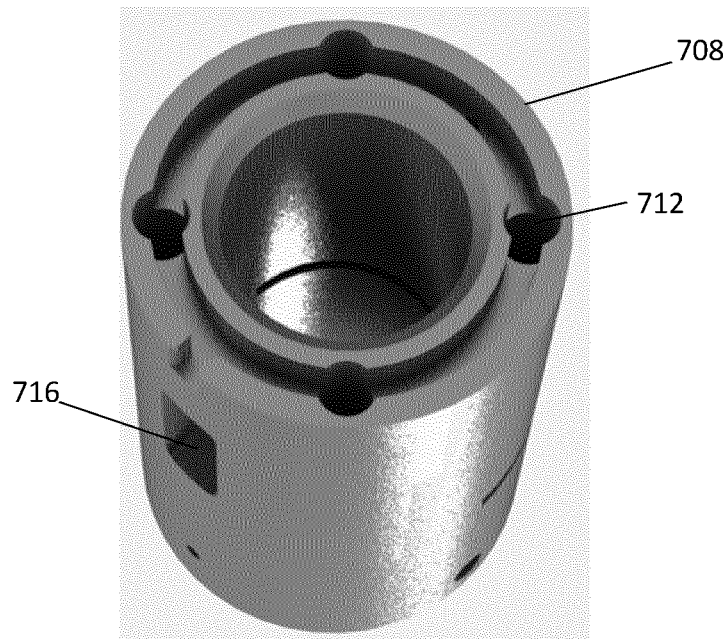
FIGS. 6a and 6b are schematic representations of heated shrouds forming part of the extraction assembly shown in FIG. 4.
Figure 6B:
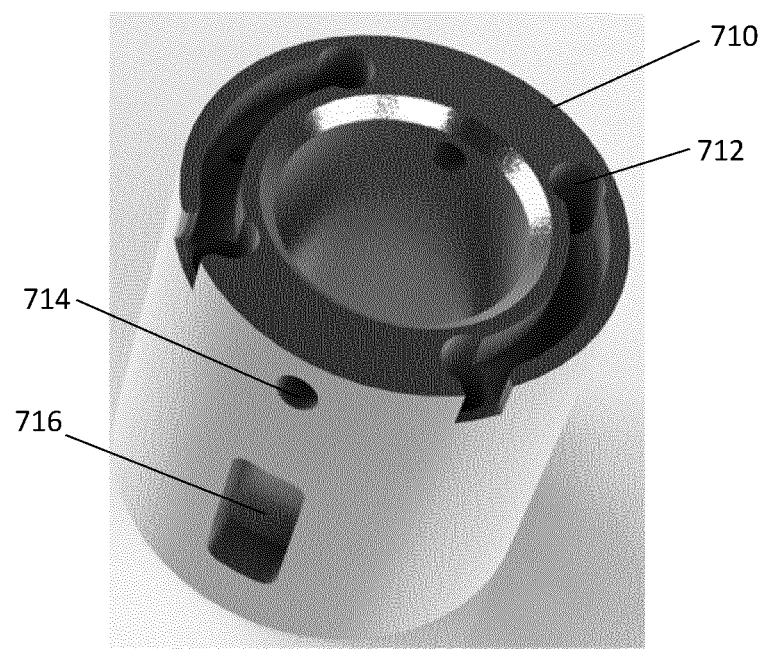

Referring back to FIG. 4, the extractor assembly 204 further comprises two heated shrouds 708, 710 which are illustrated in more detail in FIGS. 6a and 6b. The heated shrouds 708, 710 are positionable around the container 502 and plungers 508, 510 and serve to regulate the temperature of the container 502 within the extraction module 204.

Although the container 502 is in the heated enclosure 304, the container 502 nevertheless requires additional heating to ensure that the temperature of the container and its contents are raised to a predetermined temperature required for the supercritical fluid extraction process to take place, for example about 50° C., and maintained at that level. For this reason the two heated shrouds 708, 710 surround the container 502 during extraction in order to maintain the temperature of the container and its contents at approximately 50° C.

The heated shrouds 708, 710 are, in this embodiment, made from anodised aluminium to aid with thermal conductivity.

The shrouds 708, 710 are heated using cartridge heaters which are held in heater recesses 712. The heaters may be set to operating at a specific temperature, such as 50° C., throughout the process using any suitable control device. In embodiments of the invention the control device may be a PID controller.

In this embodiment of the invention, closed loop feedback is provided in each of the shrouds 708, 710 by temperature sensors (not shown) which are located in sensor recesses 714.

Each of the shrouds 708, 710 has a resettable thermal trip (not shown) which are located in trip recesses 716. These thermal trips are set to trigger at a temperature above the desired temperature of the container, for example 60° C. in this embodiment of the invention. In the event that a fuse is tripped, the power is cut to the heater cartridges and the emergency stop is triggered. This prevents temperature run away if the PID controllers fail and the cartridges remain on.

Referring again to FIG. 4, The extractor assembly 204 further comprises an aluminium support frame 530 comprising a first platform 512 and a second platform 514. In this example, the first plunger 508 (not shown) is positioned within the first heated shroud 708 and in alignment with the first platform 512. Further in this example, the second plunger 510 (not shown) may be positioned within the second heated shroud 710 and coupled to the aluminium support frame 530 such that it extends down from the second platform 514.

Also in this example, the container 502 is positioned such that it engages with the second plunger 510, grippers 516 may hold the container 502 in this position. Pneumatic cylinders 520 may then be activated to cause the first plunger 508 to engage with the container 502 until the plungers 508, 510 and the container 502 have the position shown in FIG. 5b. The configuration of the components shown in FIG. 4 is an example only. Other configurations may also be suitable for carrying out a method according to embodiments of the invention.

In this embodiment of the invention, the second plunger 510 is stationary, whereas the first plunger 508 is moveable due to the action of the pneumatic cylinders 712 which raise the plunger 508 so that it engages with the container 502.

The extraction assembly 204 is designed around the aluminium support frame 530 which is designed to withstand forces up to 500 bar.

The pneumatic cylinders 712 not only cause the plungers 508, 510 to engage with the basket 502 but also then perform the step of compressing the substrate into a predetermined volume in chamber 602 (see FIG. 5b). The substrate is compressed in this way to increase substance recovery and reduce the total volume of required solvent.

As can be seen in FIG. 4, the cylinders are located below the container loading position.

During the extraction stage 104, the container 502 will be pressurised to a predetermined pressure between 200 and 500 bar. To withstand this pressure, the extractor assembly 204 further comprises mechanical locking jaws 518 which are adapted to clamp around the compression cylinders 520 and lock the first plunger 508 in position when it is fully engaged with the container 502 and the extraction process is operating.

In this embodiment of the invention the seals 608, 610 have a polymer external surface with a stainless-steel spring to help hold shape during pressurisation.

The polymer external surface may be made from any suitable polymer and is used to prevent contamination and sample substance loss between extraction runs.

Once the container is loaded into extraction assembly 204, the plungers 508, 510 are engaged with the container 502 and the mechanical locking jaws 518 are engaged around the compression cylinders 520, the extraction stage 104 of the method represented in FIG. 1 may continue. The fluid delivery assembly 202 controls the delivery of high-pressure solvent and co-solvent to the extraction assembly 204 (see FIG. 2) and into the container 502.

This process first involves priming pumps forming part of the fluid delivery assembly 202. The pumps then begin the flow of the solvent ($CO_2$ in this embodiment) and co-solvent from their respective storage tanks to the extraction assembly 204 via a mixer in which the solvent and co-solvent are mixed. The solvent and co-solvent then enter the container 502 through a conduit in the first plunger 508. The extractor assembly 204 may be placed within a heated enclosure 304 (see FIG. 3) which pre-heats the lines supplying the solvent and co-solvent to the container 502.

During this stage of initial fluid delivery the pressure within the container is increased to the predetermined level, for example 300 bar. In embodiments of the invention the fluid delivery assembly 202 may comprise a Waters Fluid Delivery Module.

In order for the solvent to reach a supercritical state, the solvent must be heated to a certain temperature as well as being pressurised. In embodiments of the invention, in which the solvent is carbon dioxide, the solvent temperature required in order to reach supercritical state is 31° C. However, a temperature of at least 50° C. may be required inside the container 502 to increase the volatility of the substance to be extracted and to increases diffusivity of the carbon dioxide. The temperature increase is achieved and maintained through a combination of the heated enclosure 304 and the heated shrouds 708, 710 described above and shown in FIGS. 6a and 6b.

Once the desired temperature and pressure is achieved within the container 502 and the solvent transitions to a supercritical fluid, the extraction of the adsorbed substance from the substrate 112 is enabled. A pressure control valve or back-pressure regulator 205 positioned after the second plunger 510 allows the supercritical fluid containing collected extract to gradually exit the container 502, thereby maintaining the desired pressure. The SCF therefore gradually passes through the material of the substrate 112 in the container 502 at high pressure and captures the substances that were adsorbed onto the substrate 112. This process continues for a period of time until the extraction of the adsorbed substance is complete. After the process has run for an appropriate time, the fluid delivery system will be stopped, and the system will be de-pressurised to 3 bar.

Once the SCF exits the container 502 and the extraction assembly 204 it flows into the separation assembly 206 where the separation stage 106, of the method schematically represented in FIG. 1, is performed. During the step in which SCF flows from the extraction assembly 204 to the separation assembly 206, the pressure is gradually reduced.

Figure 7:
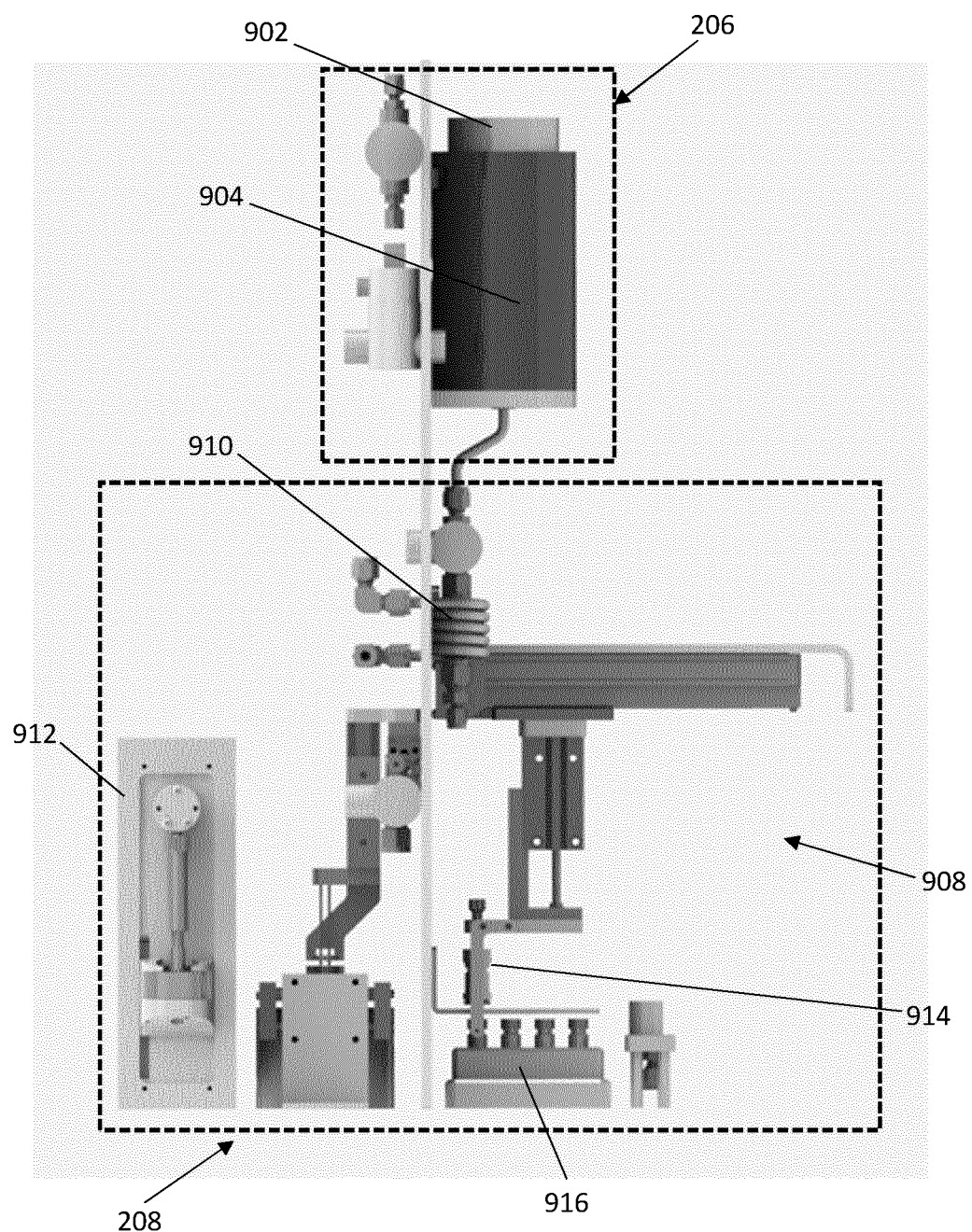
FIG. 7 is a schematic representation of the separation assembly and dispenser assembly also forming part of the rig shown in FIG. 3.

The separation assembly 206 is shown in more detail in FIG. 7. The separation assembly 206 comprises a separator 902 around which is positioned a temperature control shroud 904. The separation assembly also comprises a pressure control circuit (not shown).

A series of fluid lines and solenoid valves positioned around the separation assembly 206 manipulate the direction of fluid flow and pressure.

The separator 902 serves to reduce the temperature and pressure of the supercritical fluid, causing it to transition back into a liquid and a gas.

Figure 8:
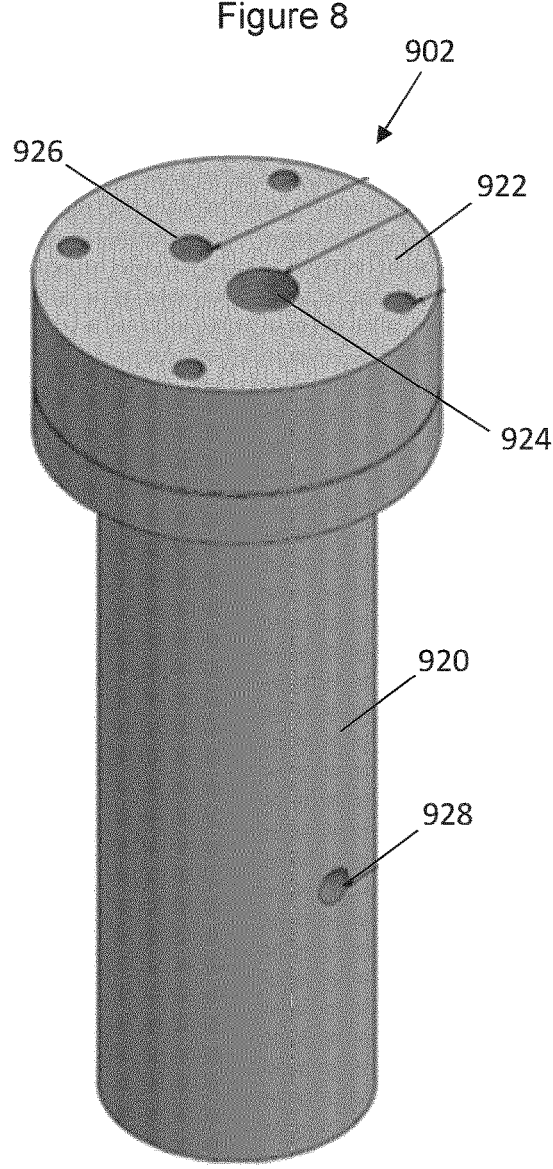
FIG. 8 is a schematic representation of a separator forming part of the separation assembly shown in FIG. 7.
Figure 9:
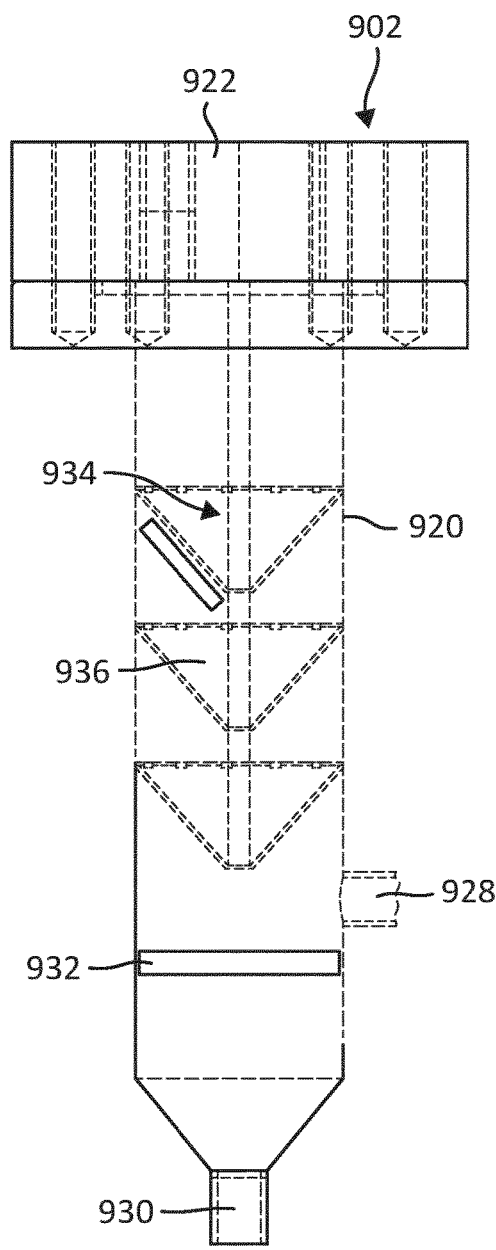
FIG. 9 is a cross-sectional view of the separator shown in FIG. 8.

FIGS. 8 and 9 show the separator 902 in more detail. The separator 902 comprises a body 920 and a removable head 922. The removable head 922 comprises a nozzle inlet 924 and a gas outlet 926. The body 920 comprises an extract inlet 928, a liquid outlet 930 and a separation chamber 932. The separator 902 further comprises a baffle assembly 934 that is positionable within the separation chamber 932 and comprises a plurality of baffles 936. In this embodiment of the invention there are three baffles 936 and they are cone-shaped mesh baffles. However, in other embodiments of the invention the baffles may be any suitable type of baffle and there may be any suitable number of baffles.

In use, the SCF flows through the gas inlet 928 and down internal walls of the separation chamber 932. The liquid extract and co-solvent are captured at the bottom of the separation chamber 932 while gaseous components are vented through the baffle assembly 934 to improve extract and extraction solvent recovery. The extract and co-solvent vapour condenses onto the baffles 936 and flows towards the bottom of the separation chamber 932. Meanwhile, gaseous extraction solvent (e.g. carbon dioxide) is vented out of the separation chamber 932 through the gas outlet 926 and unwanted heavy substances are adsorbed to internal walls of the separation chamber 932. The liquid co-solvent and extract is collected from the separator 902 into a collector 910 (shown in FIG. 7).

During the extraction process, the separator 902 is cooled to a fixed temperature, for example between −10° C. and 9° C., in preparation to receive the solvent and extract. The resulting reduction of temperature of the solvent and extract in the separator increases the recovery of extract and extraction solvent.

The baffles 936 also increase the extract and extraction solvent recovery during the extraction process. In embodiments of the invention where the extraction solvent is carbon dioxide, acetonitrile may be entrained as an aerosol in the carbon dioxide vapour. The baffles 936 comprise a fine mesh suitable for separating acetonitrile from carbon dioxide and the downward cone-shape encourages the drainage of the separated acetonitrile to the bottom of the separation chamber 932 for collection.

Once the extract has been removed from the separator 902, the separation stage 106 is complete and the separator 902 may be cleaned. The separation assembly 206 may be placed in a cleaning mode in which the separator 902 is heated to 50° C. to increase the effectiveness of substance removal. The separation chamber 932 is then flooded with cleaning solvent. The flow rate of cleaning solvent into the separation chamber is controlled to encourage removal of remaining substances. Hence the process is self-cleaning.

The temperature control shroud 904 may be made from any convenient material, and in this embodiment of the invention is made from anodised aluminium to aid with thermal conductivity and is connected to earth. The temperature control shroud 904 is insulated to reduce temperature losses.

The final stage of the method schematically represented in FIG. 1 is the dispensing stage 108 which occurs in the dispenser assembly 208.

As can be seen in FIG. 7, the dispenser assembly 208 may be operatively connected to the separator 902. The separator 902 may be connected to a dispenser 908 via the collector 910.

In embodiments of the invention, once separation is complete, the collector 910 is opened to collect the extract from the separator 902. The extract is mixed in the collector 910 and then a syringe pump 912 aspirates a predetermined volume of extract from the collector 910 and transfers it into a dispensing station 914. The dispensing station 914 dispenses predetermined volumes of the extract into a plurality of sample vials 916.

A sample of the extract may then be obtained for further analysis. Any remaining extract is pumped into a waste sink.

To ensure that the extract is homogenous, the extract is dispensed from the separator 902 into the collector 910 at a pressure of 4 bar. The collector 910 is insulated to reduce temperature loss.

A dehumidifier may be used to reduce condensation build up on the equipment.

During use, the collector may be cooled to a fixed temperature between a range of −10° C. and 2° C. to increase the recovery level of volatiles when dispensing. Coolant may be pumped around the collector to cool it.

Once the sample has been collected they may be analysed using any relevant methods.

Figure 10:
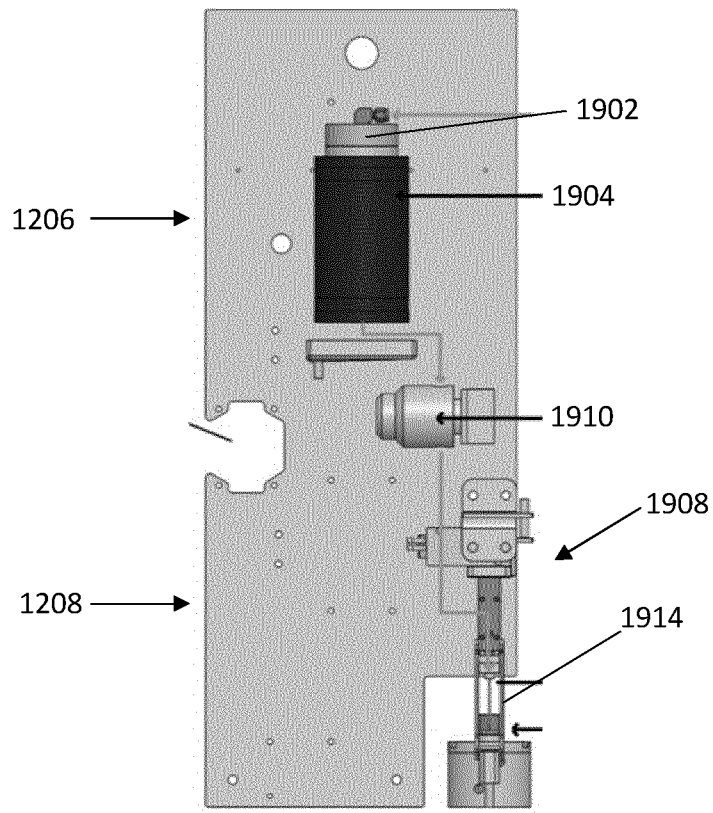
FIG. 10 is a schematic representation of a different embodiment of a separation assembly and a dispenser assembly.
Figure 11:
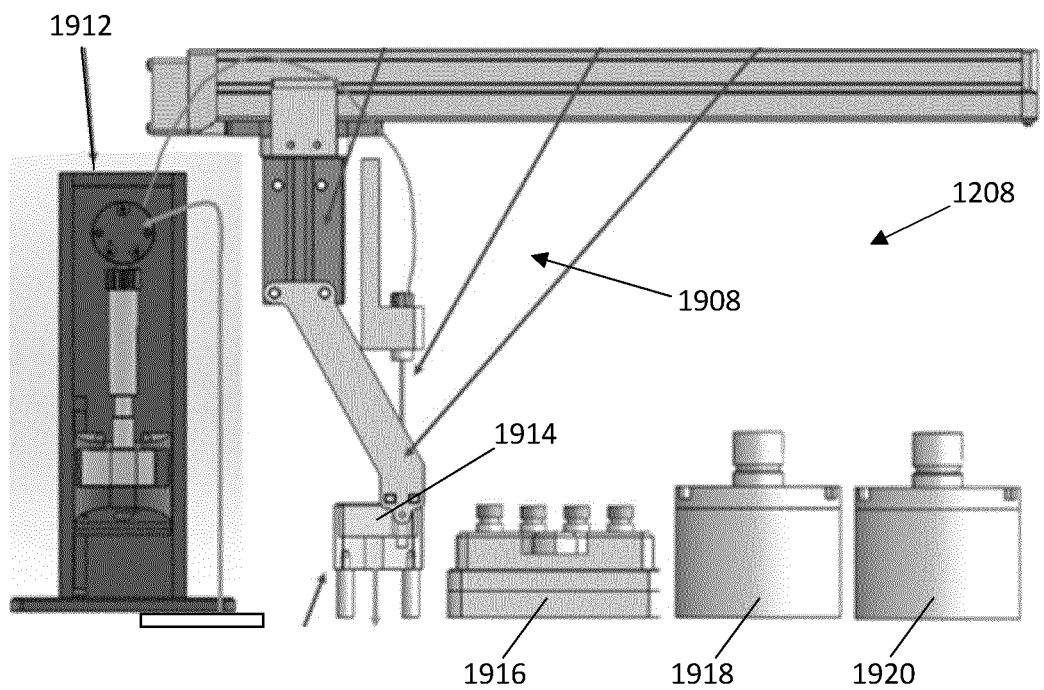
FIG. 11 is a schematic representation of the dispenser assembly shown in FIG. 7, here showing more detail.

FIGS. 10 and 11 show another embodiment of the separation assembly 1206 and dispenser assembly 1208. The separation assembly 1206 is similar to the separation assembly 206 shown in FIG. 7 and comprises a separator 1902 and a temperature control shroud 1904.

In this embodiment the separator 1902 is connected to the dispenser assembly 1208 via a valve 1910.

The dispenser assembly 1208 comprises a dispenser 1908 and a syringe pump 1912. The dispenser 1908 comprises a dispensing station 1914.

The extract may be released from the separator 1902 by the valve 1910 so that it flows to the syringe pump 1912. The syringe pump 1912 aspirates a predetermined volume of extract and transfers it into a dispensing station 1914. The dispensing station 1914 dispenses predetermined volumes of the extract into one of a plurality of sample vials 1916. The sample vials 1916 may then be stored in a collection vial holder 1920.

The dispensing station 1914 may also dispense a small quantity of an extract (100 μL for example) into a QC vial held in a QC sample vial holder 1918. During a study analysing several extracts (100 for example) a small quantity of each extract may be dispensed into the QC vial. A large disparity between analysis results for an individual extract sample and analysis results for the QC vial sample may indicate anomalous data and potentially a low-quality extract sample.

Figure 12:
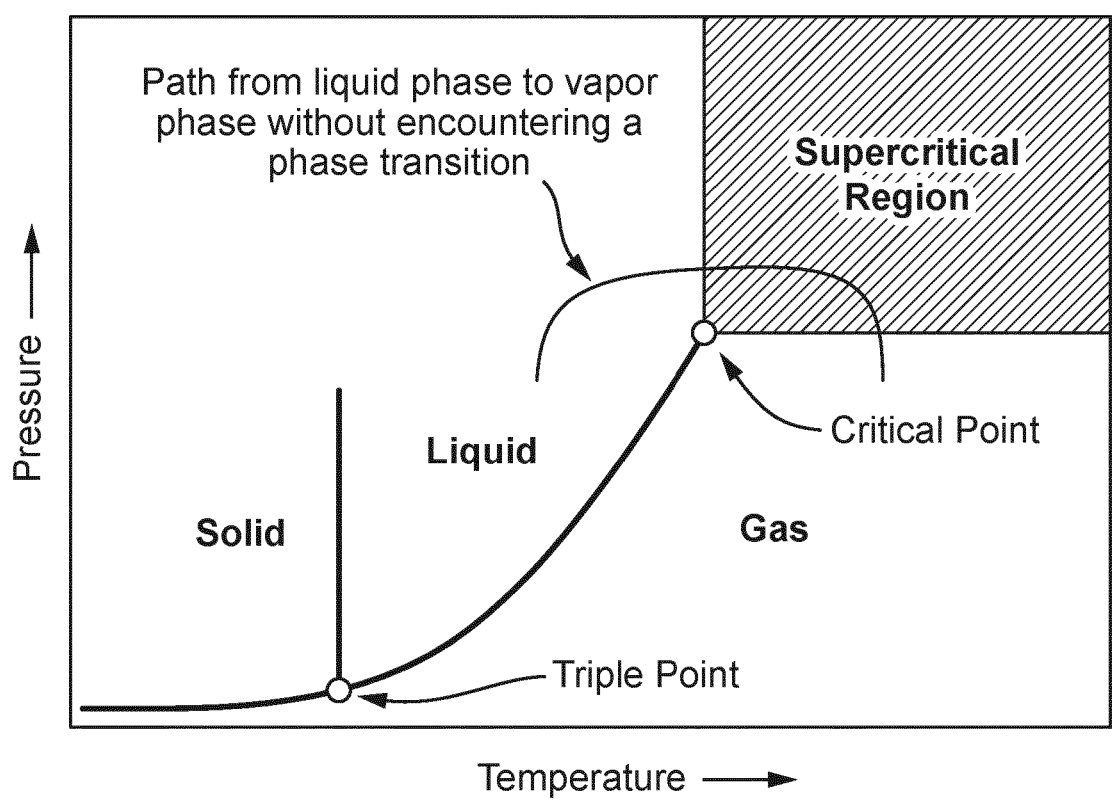
FIG. 12 is a graphical representation of how supercritical state is reached through the increase of temperature and pressure.

FIG. 12 shows a graphical representation of how a solvent may reach supercritical state through the required increase of temperature and pressure. The critical point varies for the solvent chosen. In embodiments of the invention, carbon dioxide is used as the solvent which reaches its critical point at about 31° C. and 74 bar.

The invention claimed is:

1. A method of extracting a substance comprising the following steps in the following order, wherein any one or more of the steps described are performed by an automated robotic system:
   (i) placing a substrate on which a substance has been adsorbed into a container in a form of an extraction basket;
   (ii) attaching first and second closures to first and second ends of the container respectively in order to seal the substrate with the substance within the container;
   (iii) storing the container and maintaining a temperature of the container at a predetermined temperature;
   (iv) removing the first and second closures to first and second ends of the container and replacing the first and second closures with first and second plungers which first and second plungers are releasably and sealably engageable with the first and second ends of the container respectively;
   (v) feeding a solvent into the container whilst restricting its exit by means of an electrically-controlled back-pressure regulator to achieve a predetermined pressure of the solvent in the container, wherein the solvent has a critical point and the predetermined pressure is above the critical point of the solvent;
   (vii) transitioning the solvent into a supercritical fluid within the container by heating to a temperature above its critical point as well pressurising to a pressure above its critical point;
   (viii) releasing the solvent and an extract comprising extracted substances into a separator;
   (viii) reducing the temperature and pressure in the separator to remove a gaseous portion of the solvent from the extract; and
   (ix) collecting the extract remaining from the separator.

2. A method according to claim 1 comprising a further, initial step of adsorbing the substance onto a substrate.

3. A method according to claim 1 comprising a further step prior to the step of feeding solvent into the container of applying compression to the substrate after it has been placed in the container.

4. A method according to claim 1 wherein the method step of feeding a solvent into the container comprises pumping the solvent into the container through the first plunger.

5. A method according to claim 1 wherein the method comprises a further step, prior to and during the step of feeding solvent into the container, of maintaining the container and the substrate at a predetermined temperature.

6. A method according to claim 1 comprising a further step, prior to the step of feeding the solvent into the container, of generating the solvent by mixing components comprising an extraction solvent and a co-solvent together, wherein the extraction solvent is sub-critical or supercritical $CO_2$ or a different solvent capable of reaching sub-critical or supercritical parameters.

7. A method according to claim 6, wherein the step of maintaining the container and the substrate at a predetermined temperature, comprises the step of encasing the container in a shroud.

8. A method according to claim 1 comprising an additional step of adjusting the pressure of the solvent and extract as the solvent and extract are released into the separator.

9. A method according to claim 1, wherein the separator comprises a baffle assembly and the step of reducing the temperature and pressure in the separator comprises causing the gaseous portion of the solvent to flow through the baffle assembly to separate, substances entrained in the gaseous portion of the solvent as an aerosol from the gaseous portion of the solvent.

10. A method according to claim 9 comprising a further step of causing substances separated from the gaseous portion of the solvent in the baffle assembly to flow from the baffle assembly to be collected with the extract.

11. A method according to claim 1, comprising a further step following collecting the collection of the extract, of dispensing the extract into a plurality of sample vials.

12. A method according to claim 1, comprising a further step following collecting the extract, of flooding the separator with cleaning solvent to remove solids from the separator.

13. A method according to claim 12 comprising the step of controlling a flow rate of the cleaning solvent such that self-cleaning occurs.

* * * * *